(12) United States Patent
Song

(10) Patent No.: US 6,772,891 B1
(45) Date of Patent: Aug. 10, 2004

(54) COMFORT GRIP BOTTLE HOLDER

(76) Inventor: Karen May Song, 3411 Teckla Blvd., Amarillo, TX (US) 79109

( * ) Notice: Subject to any disclaimer, the term of this patent is extended or adjusted under 35 U.S.C. 154(b) by 0 days.

(21) Appl. No.: 10/337,022

(22) Filed: Jan. 6, 2003

(51) Int. Cl.[7] ............................. A61J 9/00; A61J 9/06; A61J 9/08

(52) U.S. Cl. .................. 215/11.6; 215/11.1; 215/395; 119/71; 119/72; 220/737; 220/739; 248/102; 248/105

(58) Field of Search ............................. 215/11.6, 11.1, 215/395; 248/102, 105; 119/71, 72, 72.5; 220/737, 739, 903

(56) References Cited

U.S. PATENT DOCUMENTS

| | | | | |
|---|---|---|---|---|
| 530,435 A | * | 12/1894 | Lowerre ................. | 248/102 |
| 747,025 A | * | 12/1903 | White ..................... | 215/12.1 |
| 1,464,525 A | * | 8/1923 | Girr ......................... | 215/11.6 |
| 1,589,138 A | * | 6/1926 | Fisk ........................ | 215/11.6 |
| 1,669,061 A | * | 5/1928 | Meltzer ................... | 215/11.6 |
| 1,690,509 A | * | 11/1928 | Thoreson et al. ...... | 215/11.6 |
| 1,772,339 A | * | 8/1930 | Cole ....................... | 215/11.6 |
| 2,084,689 A | * | 6/1937 | Karl ........................ | 215/11.6 |
| 2,150,835 A | * | 3/1939 | Kazimirow ............. | 215/11.6 |
| 2,482,322 A | * | 9/1949 | Cortese .................. | 215/12.1 |
| 2,518,862 A | * | 8/1950 | Cain et al. .............. | 248/104 |
| 2,522,381 A | * | 9/1950 | Kramer .................. | 215/12.1 |
| 2,685,319 A | | 8/1954 | Swasko | |
| 3,065,944 A | * | 11/1962 | Liebendorfer .......... | 248/102 |
| 3,085,612 A | * | 4/1963 | Gobel ..................... | 215/11.6 |
| 3,110,407 A | | 11/1963 | Dahl | |
| 3,122,130 A | * | 2/1964 | Brown et al. ........... | 119/71 |
| 3,332,563 A | * | 7/1967 | Reshan ................... | 215/365 |
| 3,512,301 A | | 5/1970 | Kramer | |
| 3,584,818 A | * | 6/1971 | Essman .................. | 248/105 |
| 4,514,995 A | | 5/1985 | Curtis et al. | |
| D286,606 S | | 11/1986 | Curtis et al. | |
| 4,776,546 A | * | 10/1988 | Goldson et al. ........ | 248/102 |
| 5,188,061 A | * | 2/1993 | Lombardi ............... | 119/71 |
| 5,463,981 A | * | 11/1995 | Marcinko et al. ...... | 119/71 |
| 5,816,193 A | * | 10/1998 | Haggerty ................ | 119/71 |
| 5,871,184 A | * | 2/1999 | Kaopio ................... | 248/102 |
| 6,082,681 A | * | 7/2000 | Rand ...................... | 248/102 |
| 6,138,847 A | * | 10/2000 | Johnson ................. | 215/11.1 |
| 6,286,709 B1 | | 9/2001 | Hudson | |

FOREIGN PATENT DOCUMENTS

| | | | | |
|---|---|---|---|---|
| FR | 2595569 A1 | * | 9/1987 | ............. A61J/9/00 |
| FR | 2 600 885 | | 1/1988 | |
| GB | 0391756 | * | 7/1931 | ............. 215/11.6 |
| GB | 0429629 | * | 6/1935 | ............. 215/11.6 |
| GB | 0766082 | * | 1/1957 | ............. 215/11.6 |
| GB | 2265315 A | * | 9/1993 | ............. A61J/9/08 |

OTHER PUBLICATIONS

U. S. patent appliction Publication No. 2002/0104933A1 to Fishler, published Aug. 2002.*

U. S. patent application Publication No. 2003/0116520A1 to Abraham, published Jun. 2003.*

* cited by examiner

*Primary Examiner*—Sue A. Weaver
(74) *Attorney, Agent, or Firm*—Strasburger & Price, LLP

(57) ABSTRACT

An artificial nursing system for use by an infant animal is disclosed. The nursing system comprises a feeding bottle, a nipple and a sleeve. The feeding bottle has a top end and a bottom end, the top end of the feeding bottle is attached to the nipple. A sleeve envelopes the feeding bottle, the sleeve comprises a first section made from an elastic material, wherein the elastic material constricts around the feeding bottle and a second section fixedly attached to the first section, the second section is made from a scent accepting fabric and surrounds the nipple. The first and second sections allow the infant animal to grip the feeding bottle and nipple and the constriction of the first section of the sleeve attaches the sleeve to the feeding bottle.

20 Claims, 5 Drawing Sheets

COMFORT GRIP BOTTLE HOLDER

CROSS REFERENCE TO RELATED APPLICATIONS

Not Applicable.

STATEMENT REGARDING FEDERALLY SPONSORED RESEARCH/DEVELOPMENT

Not Applicable.

FIELD

The present invention is related to a bottle sleeve and more particularly to a bottle sleeve made of fabric which envelopes a small bottle allowing a small animal to grip the bottle during feeding.

BACKGROUND

Artificially nursing animals has been practiced for many years. The causes of such action vary, but include the death of the animal's mother, abandonment by the animal's mother, and physical/medical conditions of the animal's mother. In each of these circumstances, the infant animal is unable to nurse and is therefore unable to obtain the nutrients necessary to maintain its existence. Without a substitute animal "Mother" or an artificial nursing system, the infant animal's chances of existence are greatly reduced.

Providing surrogate animals has been attempted with varying levels of success. Some infant animals may be accepted by a surrogate animal mother, however, there is no guarantee a suitable animal will exist at the necessary time or if the surrogate animal mother will accept the infant animal and allow it to nurse.

Other systems have attempted to nurse animals with a man-made or artificial nursing system. The most common system is one that closely resembles the system currently used by many humans and their own children. In both systems, an artificial nutrient is prepared and provided to the infant via a bottle and nipple. This system is very efficient in feeding human infants. Human infants recognize the facial features of the individuals feeding them during the feeding. This recognition provides a comfort to the infant and assists in the efficiency of the feeding.

When animals nurse, the infant animal does not view the facial features of the animal mother. The infant animal relies upon its sense of smell to identify the animal's mother and receives comfort from nuzzling with the animal mother during nursing. When the bottle and nipple artificial nursing system is implemented with infant animals, the infant animals have difficulty in identifying the bottle and nipple as a feeding device due to the absence of any scent. Further, if the infant animal accepts the bottle and nipple, the animal's natural action of nuzzling is impeded by the hard plastic or glass of the bottle and nipple.

Therefore, any advancement in the ability to provide a more natural and efficient artificial nursing system would be greatly appreciated.

SUMMARY

An artificial nursing system for use by an infant animal is disclosed. The nursing system comprises a feeding bottle, a nipple and a sleeve. The feeding bottle has a top end and a bottom end, the top end of the feeding bottle is attached to the nipple. A sleeve envelopes the feeding bottle, the sleeve comprises a first section made film an elastic material, wherein the elastic material constricts around the feeding bottle and a second section fixedly attached to the first section, the second section is made from a scent accepting fabric and surrounds the nipple. The first and second sections allow the infant animal to grip the feeding bottle and nipple and the constriction of the first section of the sleeve attaches the sleeve to the feeding bottle.

BRIEF DESCRIPTION OF THE DRAWINGS

For a more complete understanding of the present invention, and for further details and advantages thereof, reference is now made to the following Detailed Description taken in conjunction with the following drawings, in which.

DETAILED DESCRIPTION OF THE DRAWINGS

Figure 1:
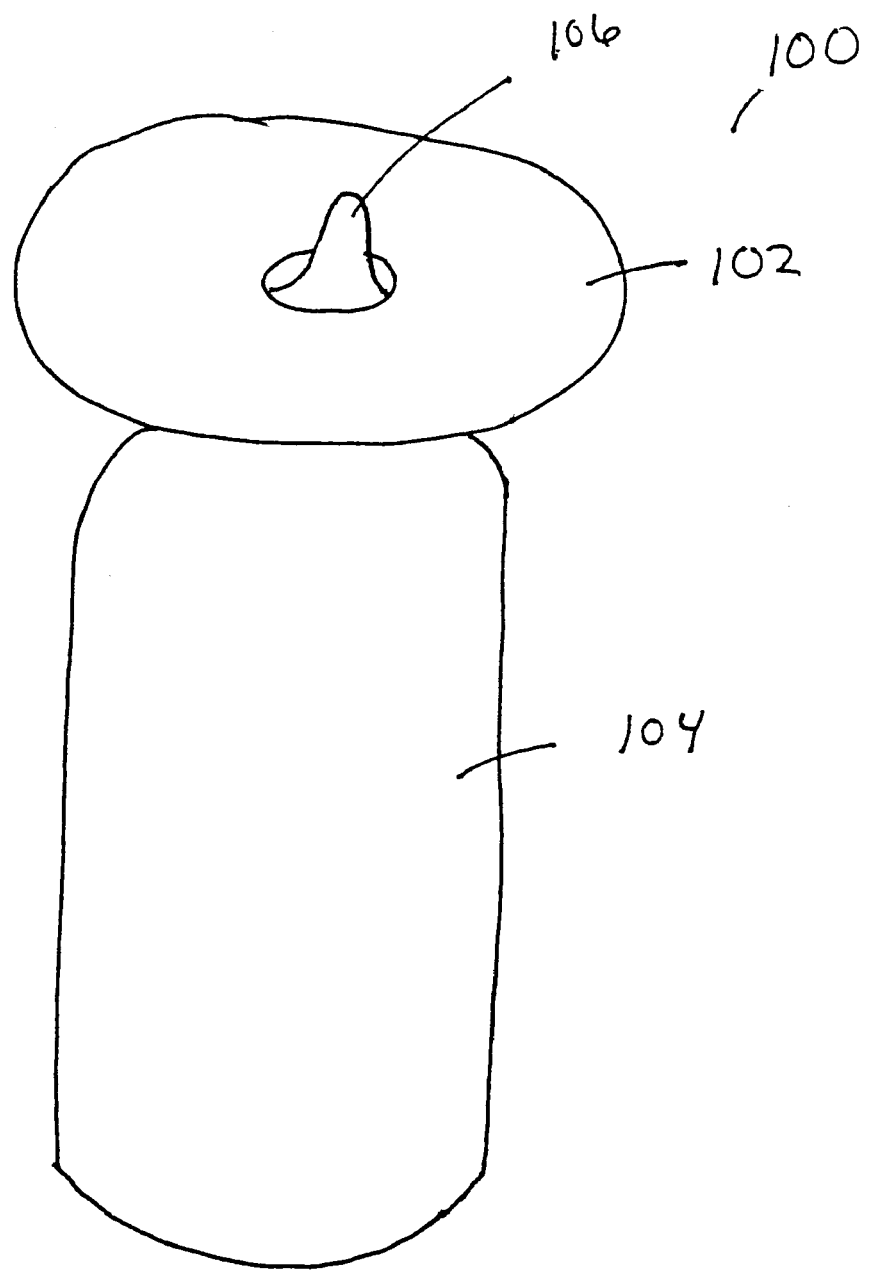
FIG. 1 is a perspective view of a sleeve with a feeding bottle and a nipple according to the invention.
Figure 2:
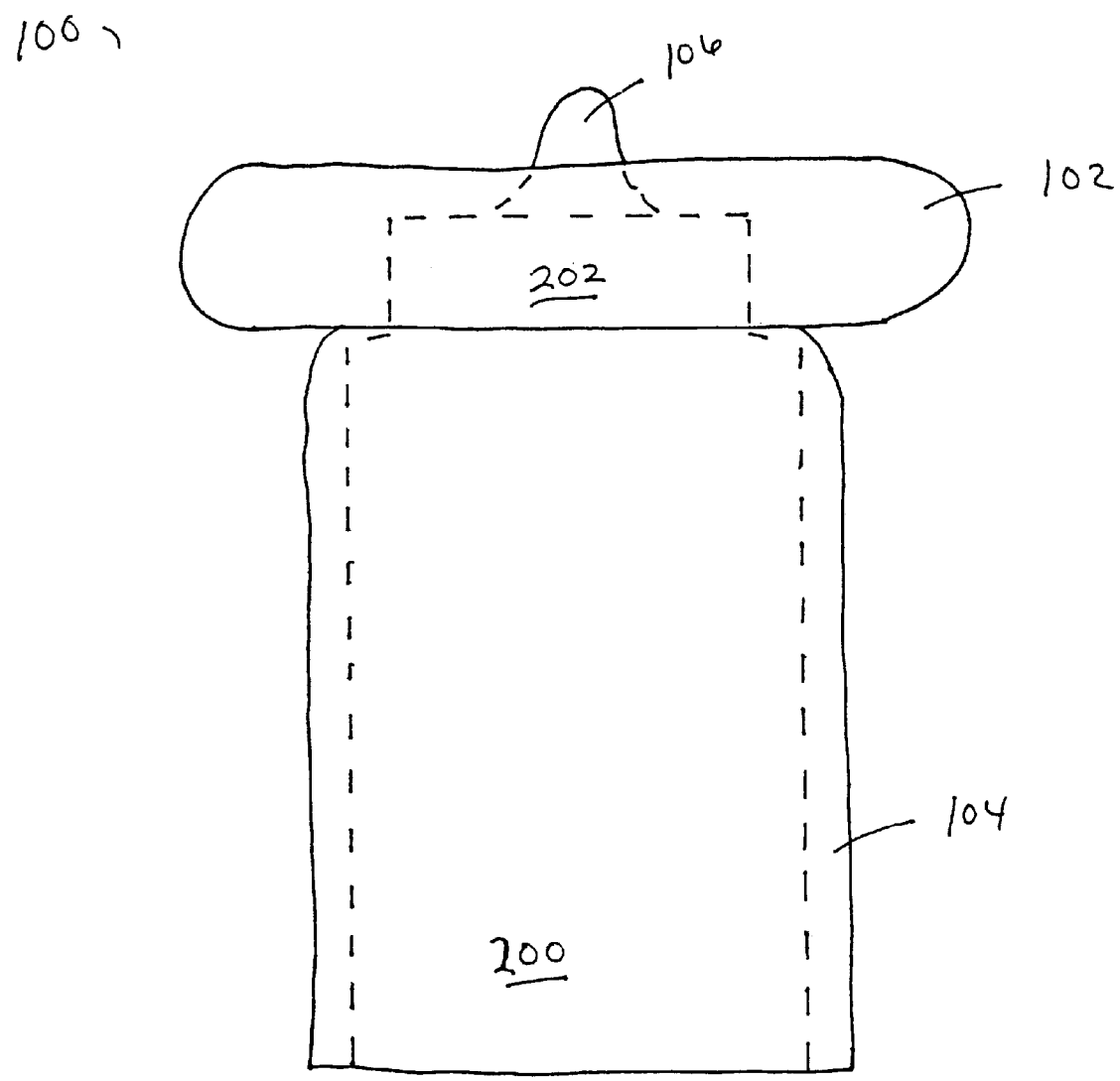
FIG. 2 is a front view of a sleeve with a feeding bottle and a nipple according to the invention.

In the descriptions which follow, like parts are marked throughout the specification and drawings with the same numerals, respectively. The drawing figures are not necessarily drawn to scale and certain figures may be shown in exaggerated or generalized form in the interest of clarity and conciseness.

Referring now to FIGS. 1, 2, 3 and 4, a bottle sleeve with a feeding bottle and a nipple are shown. The bottle sleeve 100 includes an elastic portion 104 and a fabric portion 102. The elastic portion 104 is expandable to accept bottle 200. The elastic portion 104 then constricts around the bottle 200 to securely fasten the bottle sleeve 100 to the bottle 200. The elastic portion 104 can be manufactured from a variety of different materials including but not limited to, foam, rubber or an elastic fabric such as those used in the manufacture of athletic socks. The use of a variety of elastic materials does not detract from the spirit of the invention. The fabric portion 102 is attached to the elastic portion 104. In one disclosed embodiment, the fabric portion 102 is sewn together with the elastic portion 104. However, a wide variety of attachment schemes can be implemented without detracting from the spirit of the invention. The fabric portion 102 is made from a soft, scent absorbing fabric. The fabric portion 102 surrounds the nipple 106 of the bottle 200 such that the tip of the nipple 106 is accessible by an animal. The fabric portion 102, in one disclosed embodiment, can be manufactured in a donut shape with padding to provide a soft nuzzle area for an animal feeding from the nipple 106. The soft, scent absorbing fabric of the fabric portion 102 allows for the scent of the animal feeding from the bottle 200 to be absorbed so that the animal will recognize its own scent at subsequent feedings. This recognition will assist in later feedings. The claws of the animal on both the front and rear feet typically do not grasp a plastic or glass bottle such as those shown in FIG. 6. This causes difficulty in allowing the animal to nurse. However, the claws of the front and back feet can securely grip the elastic portion 104 and fabric portion 102 of the bottle sleeve 100 of the present disclosed embodiment.

In one disclosed embodiment, the elastic portion 104 totally envelopes the bottle 200. A cap 202 of the bottle 200 is surrounded by the fabric portion 102. In an alternate embodiment (not shown), the elastic portion 104 only envelopes a portion of the bottle 200 leaving an uncovered portion remaining out from the bottom of the bottle sleeve 100. The fabric portion 102 is donut shaped and has a diameter greater than the diameter of the bottle 200 and of the elastic portion 104. However, in an alternate embodiment, the fabric portion 102 can have the same diameter as the elastic portion 104 or could have a diameter less than the elastic portion 104. In one disclosed embodiment, the fabric portion 102 has an inner diameter such that only the nipple 106 of the bottle 200 is visible and accessible by the feeding animal. Multiple bottle sleeves 100 can be manufactured to accommodate a wide variety of sizes and styles of animal feeding bottles. Such changes in size or shape do not detract from the spirit of the invention.

Figure 3:
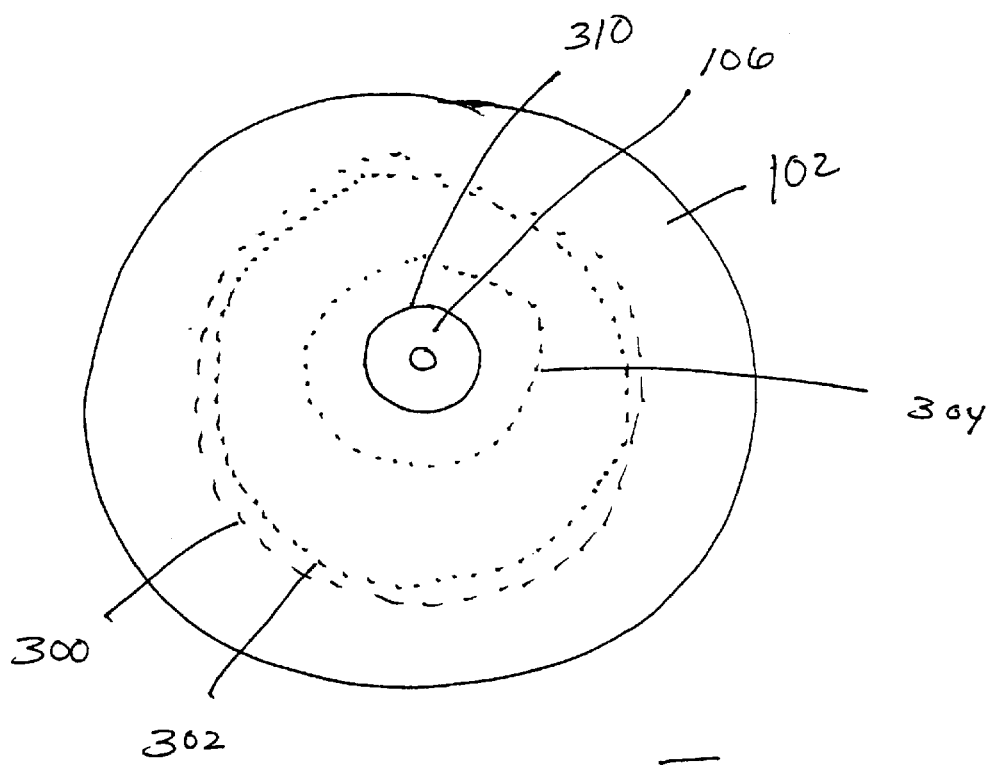
FIG. 3 is top view of a sleeve with a feeding bottle and a nipple according to the invention.

Referring now to FIG. 3, a top view of the bottle sleeve 100 with a feeding bottle and a nipple are shown. The fabric portion 102 is shown with the nipple 106 protruding from the center of the fabric portion 102. The outer diameter of the elastic portion 300 is slightly greater than the outer diameter of the bottle 302. The bottle cap 304 diameter is greater than the inner diameter 310 of the fabric portion 102. Therefore, only the fabric portion 102 and the nipple 106 are visible from a top view of the bottle sleeve 100 with feeding bottle 200 and nipple 106. The fabric portion 102 includes woven fabrics, faux fur or any other scent absorbing fabric. Further, the fabric portion 102 may be manufactured to simulate the texture and feel of the mother animal which would encourage the animal to nuzzle against the fabric portion 102 and cling to the fabric portion 102 and the elastic portion 104 during nursing from the nipple 106.

Figure 4:
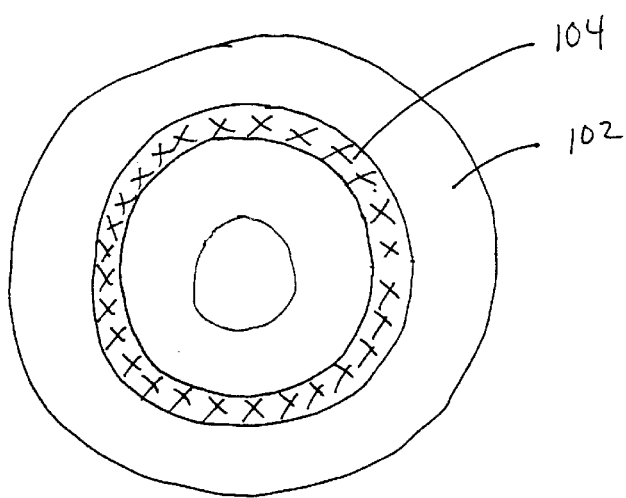
FIG. 4 is a bottom view of a sleeve with a feeding bottle and a nipple according to the invention.
Figure 6:
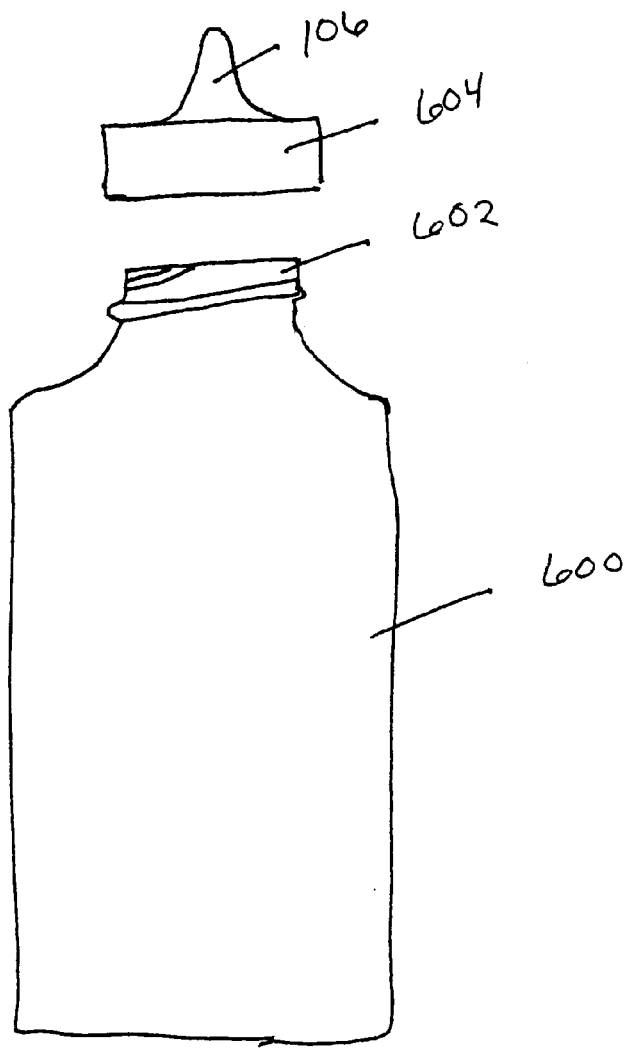
FIG. 6 is a front view of a feeding bottle and nipple according to the prior art.

Referring now to FIG. 4, the bottom view of the bottle sleeve with a feeding bottle and nipple are shown. The fabric portion 102 as shown has the greatest diameter of all portions. The elastic portion 104 is shown in this embodiment as a wide foam elastic material. A prior art bottle, such as that shown in FIG. 6, can be inserted from the bottom of the bottle sleeve 100. The insertion of the bottle 200 will expand the foam elastic portion 104 allowing the bottle 200 to be inserted through the inner diameter of the fabric portion 102. The elastic portion 104 will constrict around the bottle 600, attaching the bottle 600 to the bottle sleeve 100. In one disclosed prior art embodiment, as shown in FIG. 6, the nipple 106 is attached to a removable screw cap 604 which can be screwed on thread 602 of bottle 600. However, a variety of prior art bottle and nipple combinations may be used without detracting from the spirit of the invention including bottles with nipples permanently attached.

Figure 5A:
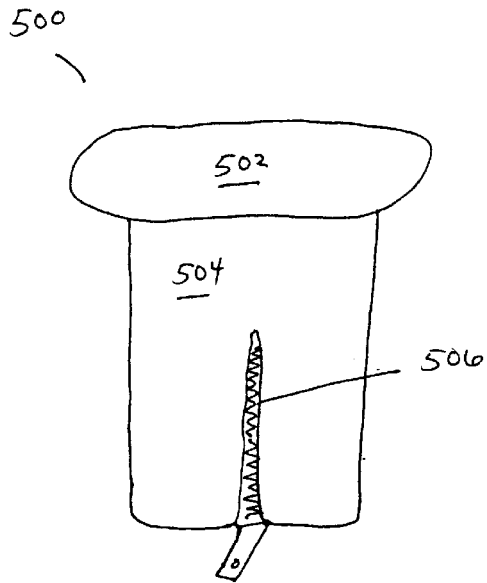
FIG. 5a is a front view of a zipper sleeve of an alternate embodiment according to the invention.
Figure 5B:
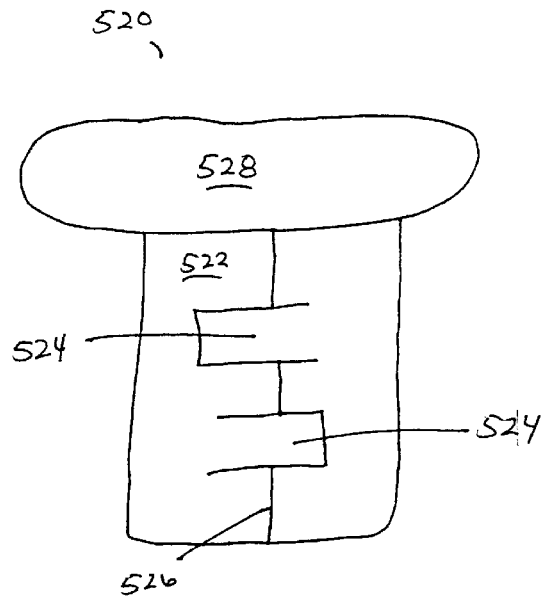
FIG. 5b is a front view of a fabric and hook closure device bottle sleeve of an alternate embodiment according to the invention

Referring now to FIGS. 5a and 5b, alternate embodiments of the bottle sleeve are shown. In FIG. 5a, a zipper bottle sleeve is shown. The bottle sleeve 500 includes a fabric portion 502 which is attached to an elastic portion 504. A zipper 506 is inserted into the elastic portion 504. The zipper 506 can be closed once a bottle 600 is inserted into the elastic portion 504, thus increasing the constriction of the elastic portion 504 around the bottle 600. In FIG. 5b, a fabric and hook closure device bottle sleeve is shown. A fabric portion 528 is attached to an elastic portion 522. The elastic portion 522 is separable and is connected via fabric and hook closure strips 524 through a center cut line 526. Thus, once the bottle is inserted through the fabric portion 528, the fabric and hook closure strips 524 can be wrapped around the bottle to constrict the elastic portion 522 to the enclosed bottle 600.

Other embodiments of the invention will be apparent to those skilled in the art after considering this specification or practicing the disclosed invention. The specification and examples above are exemplary only, with the true scope of the invention being indicated by the following claims.

What is claimed is:

1. An artificial nursing system for use by an infant animal, the nursing system comprising:
   a feeding bottle, the feeding bottle having a top end and a bottom end;
   a nipple attached to the top end of the feeding bottle; and
   a sleeve enveloping the feeding bottle, the sleeve comprising:
      a first section made from an elastic material, wherein the elastic material constricts around the feeding bottle; and
      a second section fixedly attached to the first section, the second section is made from a scent accepting fabric and surrounds the nipple;
      wherein the first and second sections allow the infant animal to grip the feeding bottle and nipple and wherein the constriction of the first section of the sleeve attaches the sleeve to the feeding bottle.

2. The nursing system of claim 1, wherein the feeding bottle is plastic.

3. The nursing system of claim 1, wherein the feeding bottle is glass.

4. The nursing system of claim 1, wherein the nipple is permanently attached to the feeding bottle.

5. The nursing system of claim 1, wherein the nipple is removably attached to the feeding bottle.

6. The nursing system of claim 1, wherein the sleeve extends to the bottom end of the feeding bottle.

7. The nursing system of claim 1, wherein the sleeve extends to a point between the top end and the bottom end of the feeding bottle.

8. The nursing system of claim 1, wherein the first section made from an elastic material includes a first section made from an elastic cloth.

9. The nursing system of claim 1, wherein the first section made from an elastic material includes a first section made from foam.

10. The nursing system of claim 1, wherein the first section made from an elastic material includes a first section made from rubber.

11. The nursing system of claim 1, wherein initially a diameter of the first section is less than the diameter of the feeding bottle and wherein the diameter of the first section is expandable to a diameter greater than the diameter of the feeding bottle.

12. The nursing system of claim 1, wherein the second section includes a padded second section.

13. The nursing system of claim 1, wherein the second section includes a section made from a soft fabric.

14. The nursing system of claim 1, wherein the second section surrounds the tip of the nipple.

15. The nursing system of claim 1, wherein the second section extends to a point below the tip of the nipple.

16. A bottle sleeve for use with a feeding bottle and nipple, the bottle sleeve comprising:
   an elastic portion for constricting around the feeding bottle;

a fabric portion fixedly attached to the elastic portion, wherein the fabric portion is made from a scent accepting fabric and wherein the fabric portion surrounds the nipple; and wherein the elastic and fabric portions allow an infant animal to grip the feeding bottle and nipple and wherein the constriction of the elastic portion attaches the sleeve to the feeding bottle.

17. The sleeve of claim 16, wherein initially a diameter of the elastic portion is less than the diameter of the feeding bottle and wherein the diameter of the elastic portion is expandable to a diameter greater than the diameter of the feeding bottle.

18. The sleeve of claim 16, wherein the fabric portion includes a padded fabric portion.

19. The sleeve of claim 16, wherein the fabric portion includes a fabric portion made from a soft fabric.

20. The sleeve of claim 16, wherein the fabric portion surrounds the tip of the nipple.

* * * * *